United States Patent Office 2,700,615
Patented Jan. 25, 1955

2,700,615

PLASTER COMPOSITION

Gustaf Bristol Heijmer, Stockholm, Sweden

No Drawing. Application April 4, 1951,
Serial No. 219,320

2 Claims. (Cl. 106—93)

The present invention relates to a plaster and spackle compound for construction purposes, particularly of the type used for interior walls and ceilings although it may also be used for exterior walls and building surfaces generally.

According to the conventional practice building walls are first subjected to a preliminary treatment such as plastering before the final surface treatment of painting, wall papering or the like.

The primary or base is produced by plastering the walls, which process however has considerable disadvantages for several reasons. Among these is the fact that considerable amounts of water are absorbed by the building through the plaster and this water must subsequently be removed by evaporation. Therefore, the plaster must be subjected to an extended drying process before plastered surfaces can be painted or papered as otherwise the coat of paint will crack and the paper will have a tendency to loosen from the wall or become mildewed. Under favorable circumstances the drying process requires one to two weeks, and the completion of the construction is correspondingly retarded, which obviously is a serious objection both from an economical standpoint and from a practical one. Furthermore, the use of conventional plaster increases the cost of materials considerably as it must be applied in thick layers of about 15 mm.

Among the objects of the present invention therefore is the provision of a plaster or spackle composition which will eliminate the foregoing disadvantages and in particular provide a quick drying composition which can be applied in a relatively thin layer either directly to the walls on the job or to boards or panels of wood, fiber and similar material prior to delivery to the construction job. A further object is to provide a plaster composition which is exceptionally plastic and elastic and which will withstand shocks and jolts without damage to the plastered wall or panel.

The composition according to the invention consists chiefly of a water-soluble cellulose derivative and inorganic fillers of varying grain sizes together with water in such quantity as to render the compound pasty or plastic. If desired, the compound may also contain a hydraulic binder, dyestuff or the like.

The spackle compound according to the invention may be applied to the base or undersurface as a thin layer of about 1 mm. to 5 mm., which naturally will result in a great saving of material. Furthermore, it can be subsequently treated without appreciable time lapse, which will result in a considerable reduction of the time factor in the construction and completion of the building. The composition, according to the invention, requires a drying period of only 10 to 15 hours, whereafter the surface may be immediately painted, papered or otherwise treated.

Suitable cellulose derivatives for use in connection with the invention may be selected from the group consisting of water-soluble methyl or ethyl-cellulose and water-soluble salts of cellulose-glycolate.

The inorganic fillers may consist of chalk and graded sand, but other substances may also be used, such as diatomaceous earth instead of chalk and graded feldspar or dolomite may be substituted for sand. It is desirable to use inorganic fillers of varying grain sizes and in certain proportions in order to give the compound maximum elasticity and tensile strength. Thus the grain sizes should range between that of suspended chalk and of pumice having a #3 fineness, a standard article of retail commerce for more than fifty years, of 35 mesh or half millimeter.

As example of binder may be mentioned gypsum. The addition of such a binder renders the compound more adaptable to penetrate deeper into joints and crevices and the tendency to form bubbles or blisters will be reduced while the water resistant qualities of the treated surface will be improved.

The following are examples of the composition of the invention, but it should be understood that they do not constitute limitations:

*Example 1*

3–8 parts methyl cellulose (dry)
100–150 parts suspended chalk
200–300 parts graded sand
3–20 parts pumice stone No. 3
80–105 parts water

*Example 2*

10–20 parts of a water suspension of ethyl cellulose containing 1 part ethyl cellulose to 25 parts water
10–30 parts chalk
20–25 parts graded sand
2–15 parts gypsum or cement As examples of the various grain sizes and proportions of the sand may be mentioned:

| | Per cent |
|---|---|
| Grains larger than 0.3 mm. | 1–10 |
| Grains 0.15–0.3 mm. | 40–50 |
| Grains 0.075–0.15 mm. | 10–20 |
| Grains smaller than 0.075 mm. | 30–50 |

According to a modification of the invention, the spackle composition may also contain one or more vegetable, animal, mineral or synthetic fiber substances. Such fiber substances may include asbestos, white peat moss, different kinds of pulp cellulose, staple fiber, animal hair, rock wool and glass fiber. The proportion of the fiber substance should not exceed 1/10 of the amount of inorganic filler.

The fiber material containing plaster composition according to the invention can be applied also in thick layers which do not collapse or crack and which after polishing will resemble a surface of very fine concrete. This plaster composition is furthermore extremely plastic and can easily be applied to lath work or similar supporting means. The fiber material in the composition serves as a reinforcement agent and thus prevents cracking and renders the plaster exceptionally durable.

The amount of cellulose derivative in the plaster compound according to the invention should preferably not exceed 2% of the content of dry substances in the mass.

Special characteristics may also be imparted to the finished plastering job or spackle job by mixing the plaster mass with an emulsion of the type oil-in-water, such as plaster emulsions, preferably containing polyvinyl acetate, or emulsions which are free of synthetic binding agents such as asphalt emulsions.

The plaster composition according to the invention can also be applied to prefabricated wall slabs, blocks, panels and the like, such as excelsior or wood fiber boards, before delivery of these boards to the construction job. The surface treated boards are then nailed or otherwise attached to the walls whereupon the joints and nail marks may be covered with the spackle composition which then may or may not be mixed with hydraulic binding agents. It will be understood that this procedure will reduce the amount of labor on the construction job to a minimum and it is made possible in the first place by the fact that the plaster composition is exceptionally elastic so that it will withstand jolts and other rough treatment during transportation which is in contrast to conventional plaster which easily cracks and crumbles. Another remarkable feature of the invention resides in the fact that it shows no tendency to crack in the seams. Still a further advantage inherent in the invention results from the facts that it serves the additional purpose of fireproofing the wood fiber boards.

It should be understood that the foregoing specification has been given by way of example and not by way of limitation and it is emphasized that the invention may find various expressions within the scope of the following claims.

What is claimed is:

1. A moldable plastic composition when mixed with water, consisting of an inorganic filler carrying 3 to 20 parts of No. 3 pumice, and graded sizes equal to 200 to 300 parts of which 1% to 10% is larger than 0.3 mm., 40% to 50% is 0.15 to 0.3 mm., 10% to 20% is 0.075 to 0.15 mm., and the balance of 30% to 50% is less than 0.075 mm., and additionally including 100 to 150 parts of suspended chalk, and not over 2% of a material selected from the group consisting of water-soluble methyl and ethyl cellulose.

2. A claim according to claim 1 in which the finest filler is fine chalk and the coarsest is pumice.

References Cited in the file of this patent

UNITED STATES PATENTS

| | | |
|---|---|---|
| 412,035 | Matt | Oct. 1, 1889 |
| 1,901,057 | Roos | Mar. 14, 1933 |
| 2,089,751 | Lang | Aug. 10, 1937 |
| 2,432,971 | Ruthman et al. | Dec. 16, 1947 |
| 2,549,507 | Morgan | Apr. 17, 1951 |

FOREIGN PATENTS

| | | |
|---|---|---|
| 624,671 | Great Britain | 1949 |